Plate 1 -

Hugh Hanna.

Threshing Machine.

REISSUED JAN 31 1871

4245

Witnesses.

A. C. Johnston.

A. R. Hurst

Inventor.

Hugh Hanna, By James J. Johnston his attorney

Plate 2.

Witnesses
A. C. Johnston
A. R. Hurst

Inventor.
Hugh Hanna By
James L. Johnston his attorney

United States Patent Office.

HUGH HANNA, OF PITTSBURG, PENNSYLVANIA.

Letters Patent No. 84,546, dated December 1, 1868; reissue No. 4,245, dated January 31, 1871.

IMPROVEMENT IN THRASHING-MACHINES.

The Schedule referred to in these Letters Patent and making part of the same.

*To all whom it may concern:*

Be it known that I, HUGH HANNA, of Pittsburg, in the county of Allegheny and State of Pennsylvania, have invented certain new and useful Improvements in Thrashing-Machines; and I do hereby declare that the following is a full, clear, and exact decription thereof, reference being had to the accompanying drawing, and to the letters of reference marked thereon.

The nature of my invention consists in a thrashing-machine with a revolving reel provided with detachable beaters, the forward or working faces of which are arranged at an acute angle to a line radiating from the axis of the reel.

My invention also consists in combining with said beaters an adjustable concave, (said beaters and concave being susceptible of adjustment with relation to each other,) for the purpose of adapting the machine to thrashing either grain or the lighter and more delicate crops, such as clover, timothy, grass, and other products.

To enable others skilled in the art to make and use my invention, I will proceed to describe more fully its construction and operation.

In the accompanying drawing which forms part of my specification—

Figures 3, 5, 6, 7, and 8, are views of detached parts, to be hereinafter particularly referred to.

Figure 4:
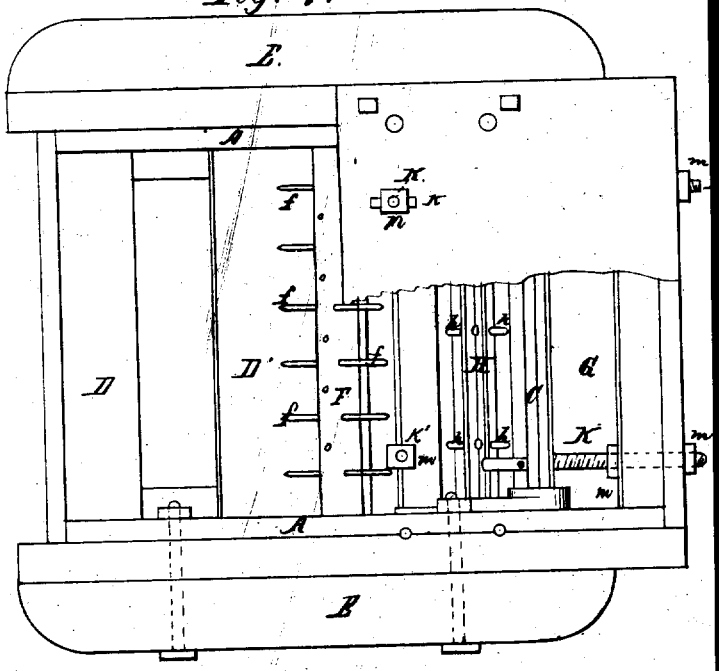
Figure 3:
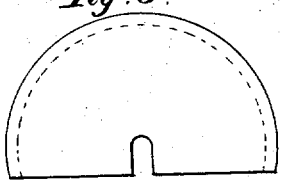

Figure 4 is a plan or top view of the machine, with a portion of the cover broken away to expose the parts beneath.

Similar letters of reference indicate corresponding parts in the several figures.

A represents the frame or casing, containing the several parts constituting the thrashing-machine.

B is a thrashing-reel or beater.

The reel B is mounted upon an axle or central shaft, B', which receives a very rapid rotary motion from a belt, or otherwise, and which imparts its velocity to the reel.

Figure 1:
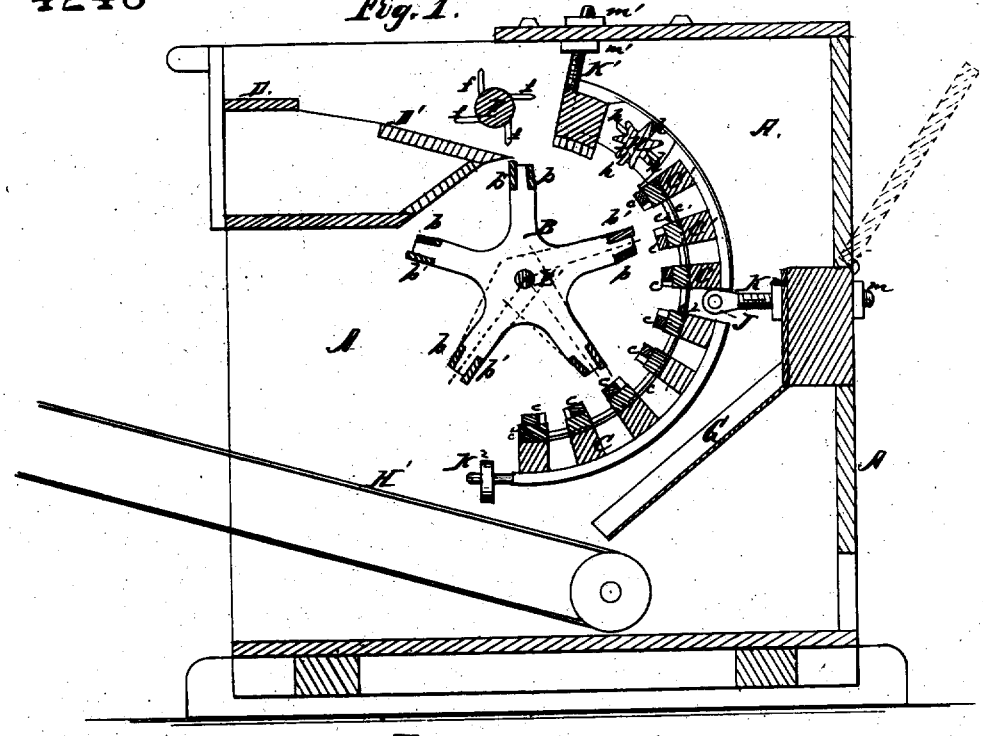
Figure 1 is a vertical central section of a thrashing-machine, illustrating my invention, the plane of sections being at right angles to the axis of the revolving reel or beater.
Figure 2:
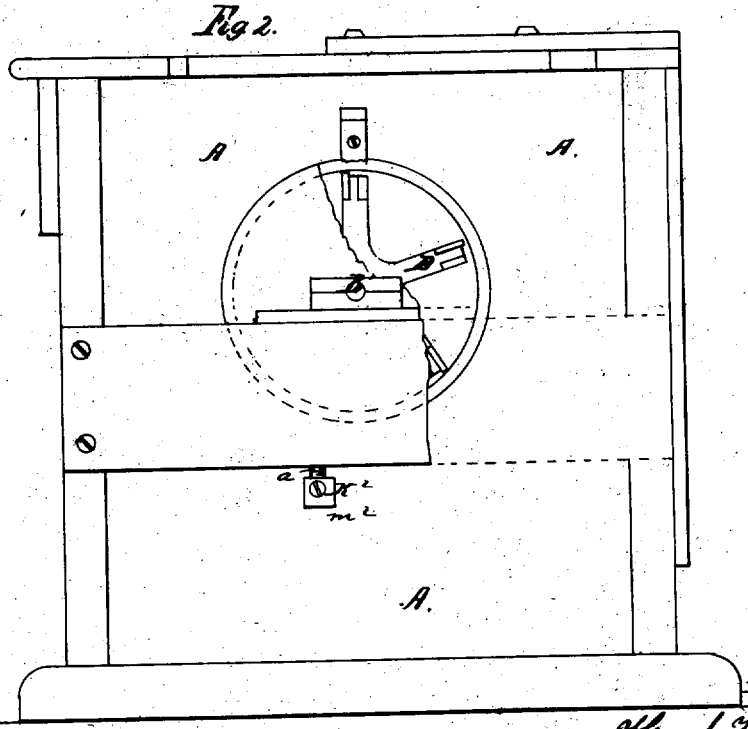
Figure 2 is a side elevation of the same.
Figure 5:
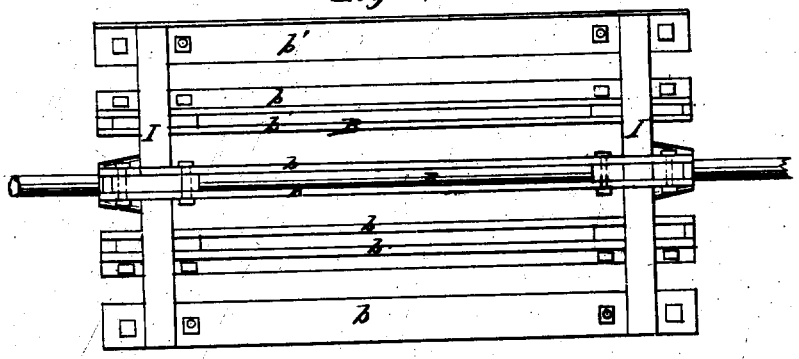

A reel of the construction shown in section in fig. 1 is shown in elevation in fig. 5, with a slight modification.

C represents what is commonly styled the "concave," it being essentially a series of parallel bars or sections, which are connected by parallel wires, running at right angles thereto, and which are studded on the inner surface with projections properly disposed and spaced, to effect the detachment of the grain or seed from the straw, hay, or clover, as it is acted upon by the reel B, which, in revolving, carries its bars or beaters *b b'* around in the desired proximity with said teeth or projections.

The attendant sits upon the seat D, and takes the hay and grain from the platform E, whether the same be at the right or left-hand side, (both positions being indicated in fig. 4,) and passes it upon the inclined board D' to the feeder F, which is a rotating roller armed with teeth or prongs, *f*.

The feeder F delivers the grain or straw or hay into the space, wherein it is caught by the beaters *b b'* of the reel B, and thereby carried around in the arc of a circle in contact with the projections *c* of the concave C.

Figure 7:
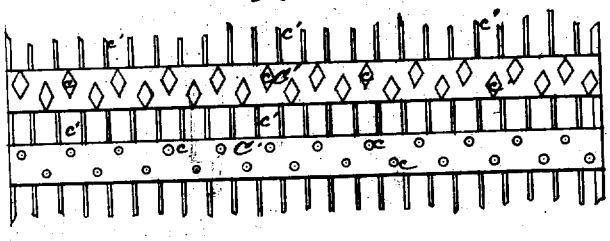

Fig. 7 is a plan of a portion of the concave C, and will at once convey an idea of its structure.

As the grain or seed is detached from the straw it passes between the wires *c' c'*, thence into the inclined conducting-board G, which may deliver it to a conveyer H', arranged so as to deposit it into a separating-machine.

The straw or hay does not pass through the wires of the concave, but escapes from the action of the reel when it reaches the lower end of the concave.

Figure 6:
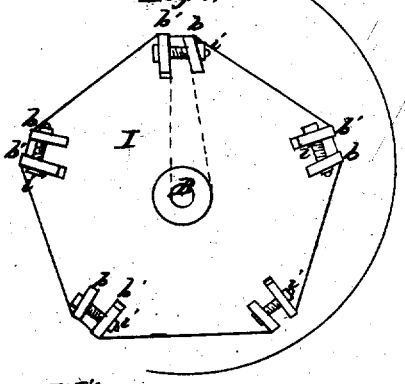

The circle of which the concave is an arc and that described by the blades or beaters are not concentric, the eccentricity being such that the space between the circle described by the blades or beaters *b b'*, and the concave gradually contracts from the receiving or upper to the discharging or lower end, as is clearly represented by the red line in fig. 6.

H represents a corrugated roller situated between the two upper bars of the concave C, and having fingers or prongs, *h*, projecting from it, as shown in figs. 1 and 4.

This roller H is capable of turning upon its axis, yet there is such friction to be overcome at its bearings that considerable force is required to give it a partial rotary movement.

Hence, the roller has a tendency to retard any superfluous quantity of straw or hay on its way to the interior of its concave, and the fingers *h* serve to separate the matted or too compact portions.

This combined retarding and separating action causes the hay or straw to be fed to the action of the thrashing mechanism in uniform quantity, and prevents the choking up of the machine, and insures its effective operation.

One of the chief features of my invention consists in the method of applying the blades or beaters to the reel B, to wit, arranging the working or forward face of the beaters at an oblique angle to a line radiating from the axis of the reel.

Fig. 6 is intended to represent the beaters arranged in pairs, as indicated at *b b'*, but I do not wish it understood that I confine my invention to this feature of arranging the beaters in pairs for single beaters *b* may be used instead of using them in pairs as at *b b'*, but in either case the beaters must have the working face arranged at an oblique angle to a line radiating from the axis of the reel B.

In fig. 1 the reel B is represented as having a series of radial arms near the ends of the shaft B', the beaters *b b'* being attached to the outer extremities of said arms.

In figs. 5 and 6 the reel is shown as having two polygonal plates, I I, instead of the radial arms seen in fig. 1.

The salient portions of the plates I I are slotted, to receive the ends of the blades or beaters *b b'*, and screw-bolts, *i i*, secure the beaters to the plates I I; said bolts passing through lateral projections or enlargements on the plates, which form the means of attachment to the latter.

The beaters *b b'*, as shown in fig. 1, are merely bolted or otherwise fastened to the ends of the radial arms.

In either case, that is to say, whether the reel be of the form shown in fig. 1, or in fig. 6, the beaters *b b'* are to be applied in the manner which I shall now describe.

The blades or beaters *b b'* are arranged upon the reel B in pairs, and lines drawn through the beaters longitudinally would be parallel, but right lines drawn transversely through the two beaters of a pair would meet at an acute angle, that passing through *b'* being more nearly radial to the shaft B' than that passing through *b*, as indicated by the dotted lines in fig. 6.

The blade or beater *b* will, if it precede the blade or beater *b'*, as the reel B revolves, act upon the hay or straw sidewise, or with its face or forward side, instead of directly with its edge.

This sidewise action has not the same tendency to bruise or injure the hay or straw as the edgewise action, and hence, when delicate straw, as oats and wheat, under some conditions, or hay or grass is to be operated upon, the reel B is mounted so as that the beaters *b* shall precede the beaters *b'*, the effect being to thoroughly thrash the grain or seed, and yet leave the hay or straw in an uninjured condition.

With ordinary wheat-straw, however, the case is different, it being able to withstand the edgewise action of the beaters *b'* without injury.

Hence, when wheat is to be operated upon it may be preferable, as a general thing, to have the beaters *b'* precede the beaters *b*.

And, to adapt the reel to these different kinds of work, a portion or portions of the side of the casing A are made removable, so that the reel B may be taken out, its ends reversed in position and remounted in the bearings.

In order that both of the beaters *b b'* of a pair may act upon the hay or straw, although the effective action mainly depends upon the preceding beater, the following or hindmost beater of the pair is adjusted so as to be somewhat more salient or further from the center than the preceding beaters.

This adjustment of the beaters necessarily takes place as often as the cylinder or reel is reversed.

Different kinds of work involve variation in the capacity or space between the beaters and the concave, and hence, I regulate said space, as occasion may require, by the adjustment of the concave C toward or away from the reel.

To admit of the more perfect adjustment of the concave the latter is divided centrally and longitudinally, and its two parts are connected by hinges, of which the rod J is the pintle, and said rod passes through the head of eye-bolts, K K, passing through the rear side of the frame or casing A.

The upper and lower ends of the concave C are supported, respectively, by the eye-bolts $K^1$ $K^1$ and $K^2$ $K^2$, and the bolts K are moved inward or outward and held in adjustment by means of the nuts *m m*, while the bolts $K^1$ $K^1$ which pass through the top of the casing are made adjustable, both vertically and horizontally, by means of the nuts $m^1$ $m^1$ and slot *k*.

The lower bolts, which pass through slot *a'* in the opposite side of the casing A, are adjustable vertically by means of the nuts $m^2$.

It is manifest that, by these adjusting devices, the concave can be placed and maintained in the most favorable position in relation to the beaters.

Figure 8:
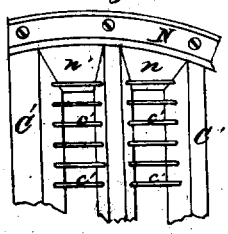

In fig. 8 the concave is shown detached, and this figure illustrates one way of carrying out my plan for removal, addition, or substitution, with respect to the bars *c* which intersect the wires *c'* of the concave C.

These bars *c'* are held together by metallic stocks or bent plates N N, to which they are attached by means of screws or other appliances which will admit of the ready attachment and detachment of said bars, and the spaces between the bars *c'* at the ends are filled with removable blocks *n n*.

One or more of the bars *c'* may be removed from the concave, and blocks, such as *n*, inserted in its or their place, said blocks being intended to tighten the parts of and give stability to the concave.

The bars *c* may be so connected that two or three or a whole set may be removed from the stocks or plates N N of the concave at one time, and a corresponding, or greater or lesser number inserted.

This replacement or substitution is desirable, from the fact that a change in the form or number of the concave's projections *c* will increase the efficiency of the machine in certain cases.

The projections *c* are not designed to be independent or separate teeth, but are cast upon iron plates, $c^2$, which constitute a durable facing for the inner sides of said bars.

The projections *c* may be disposed upon the bars or plates in the manner shown in fig. 7.

To preserve the beaters *b b'* "in train," or, in other words, maintain a proper operative relation between them and other parts of the machine, notwithstanding the adjustments and shifting to which they are liable, I propose to employ keys, or any other suitable appliances, in addition to the bolts *i*. The projections *c* may be more or less salient.

The above-described machine possesses marked advantage over thrashing-machines heretofore devised.

It operates effectively in thrashing out the grain or seed, and yet it does not bruise, mash, break, crack, injure, or deteriorate the nutritive qualities of the straw or hay.

Owing to the construction of the reel and the manner of its operation, it effects a reduction of the power heretofore required to drive a thrashing-machine of equal capacity.

Having thus described the nature, construction and operation of my improvement,

What I claim as of my invention is—

1. In a machine for thrashing grain, a reversible beater-reel, constructed substantially as described, provided with removable beater-blades whose forward or working faces are arranged at an acute angle relative to a line radiating from the axis of said reel, as and for the purpose specified and set forth.

2. In combination with a thrashing-reel, constructed, arranged, and operating as above described and claimed, a concave, in one or more sections, and susceptible of being adjusted with relation to said reel, as and for the purpose hereinbefore described.

HUGH HANNA.

Witnesses:
A. C. JOHNSTON,
JAMES J. JOHNSTON.